US012623686B2

(12) United States Patent

Clawson et al.

(10) Patent No.: US 12,623,686 B2

(45) Date of Patent: May 12, 2026

(54) SYSTEMS AND METHODS FOR CONTROLLED DECELERATION

(71) Applicant: Zoox, Inc., Foster City, CA (US)

(72) Inventors: Taylor Scott Clawson, Hyde Park, UT (US); Brian Michael Filarsky, San Francisco, CA (US); Jefferson Bradfield Packer, San Francisco, CA (US); Olivier Amaury Toupet, Escondido, CA (US)

(73) Assignee: Zoox, Inc., Foster City, CA (US)

( * ) Notice: Subject to any disclaimer, the term of this patent is extended or adjusted under 35 U.S.C. 154(b) by 219 days.

(21) Appl. No.: 17/819,805

(22) Filed: Aug. 15, 2022

(65) Prior Publication Data

US 2024/0051573 A1 Feb. 15, 2024

(51) Int. Cl.

| | |
|---|---|
| *B60W 40/04* | (2006.01) |
| *B60W 30/095* | (2012.01) |
| *B60W 30/14* | (2006.01) |
| *B60W 40/105* | (2012.01) |
| *B60W 60/00* | (2020.01) |

(52) U.S. Cl.

CPC .... *B60W 60/0011* (2020.02); *B60W 30/0956* (2013.01); *B60W 30/146* (2013.01); *B60W 40/04* (2013.01); *B60W 40/105* (2013.01); *B60W 60/0015* (2020.02); *B60W 2554/40* (2020.02); *B60W 2554/80* (2020.02)

(58) Field of Classification Search

CPC ......... B60W 60/0011; B60W 60/0015; B60W 30/0956; B60W 30/146; B60W 40/04; B60W 40/105; B60W 2554/80; B60W 2554/40

USPC .......................................................... 701/23

See application file for complete search history.

(56) References Cited

U.S. PATENT DOCUMENTS

| | | | |
|---|---|---|---|
| 2017/0291602 A1 | 10/2017 | Newman | |
| 2018/0339704 A1* | 11/2018 | Jo | B60T 7/22 |
| 2019/0039626 A1* | 2/2019 | Hatano | B60W 60/0053 |
| 2019/0278276 A1* | 9/2019 | Zhang | G05D 1/027 |
| 2020/0031362 A1 | 1/2020 | Lee | |

(Continued)

FOREIGN PATENT DOCUMENTS

| | | | | |
|---|---|---|---|---|
| DE | 102018218154 A1 * | 4/2020 | | B60W 20/12 |
| JP | 2007145313 A | 6/2007 | | |
| KR | 20160111069 A | 9/2016 | | |

OTHER PUBLICATIONS

Joseph Funke, Collision Avoidance and Stabilization for Autonomous Vehicles in Emergency Scenarios, Jul. 2017, IEEE Transactions on Control Systems Technology, vol. 25 No. 4 (Year: 2017).*

*Primary Examiner* — Matthias S Weisfeld

(74) *Attorney, Agent, or Firm* — Lee & Hayes, P.C.

(57) ABSTRACT

Systems and techniques for determining deceleration controls to use in a trajectory for use in stopping a vehicle are described. A deceleration determination system may receive a trajectory from a trajectory determination system and determine, based on various deceleration parameters, the appropriate controls to configure in a longitudinal profile of the trajectory and the suitable implementation points for implementing the controls. The deceleration determination system may determine deceleration data for various types of trajectories that a vehicle computing system may select from for operating the vehicle based on current conditions.

20 Claims, 5 Drawing Sheets

(56)  References Cited

U.S. PATENT DOCUMENTS

| | | | |
|---|---|---|---|
| 2021/0200231 A1* | 7/2021 | Zhu | B60W 30/181 |
| 2022/0041298 A1* | 2/2022 | Schurek | B64D 43/00 |
| 2023/0182696 A1* | 6/2023 | Yeom | B60Q 9/008 |
| | | | 701/23 |
| 2023/0322228 A1* | 10/2023 | Tominaga | B60W 40/10 |

* cited by examiner

200

SYSTEMS AND METHODS FOR CONTROLLED DECELERATION

BACKGROUND

Vehicles may be equipped with systems used to detect objects in an environment and control the vehicle to avoid the objects. Vehicles may also be equipped with a trajectory planning system that determines an operational trajectory for the vehicle that may be used to control a vehicle as it travels within an environment. A vehicle traveling through an environment using such a trajectory may decelerate as it travels in the environment, for example when approaching a planned stopping point or experiencing an unexpected event, such an unexpected obstacle entering the path of the vehicle or a vehicle malfunction. Maintaining passenger comfort and safety while continuing to safely operate a vehicle during deceleration may, at times, present challenges.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
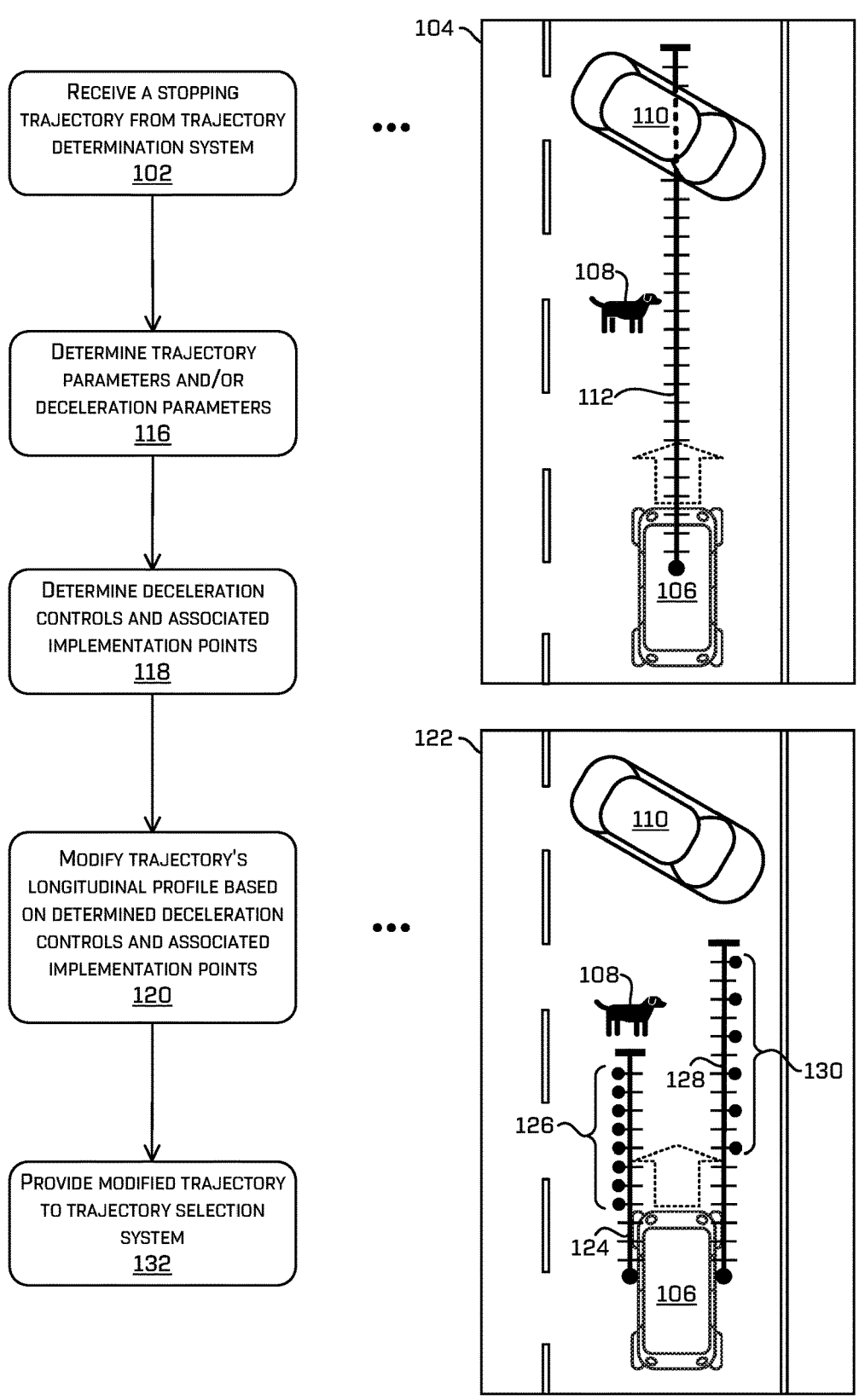
FIG. 1 illustrates an example process for determining and implementing controlled deceleration in a vehicle, in accordance with examples of the disclosure.

A vehicle may be capable of implementing various levels of deceleration, for example, by applying various amounts of braking pressure. The use of different levels of deceleration may have associated impacts on vehicle performance and passenger comfort. The various techniques described herein may be used to determine appropriate deceleration levels for particular times and/or locations along a region of travel for a vehicle to improve vehicle safety and passenger comfort. Systems and techniques for determining a deceleration level to apply at a vehicle to implement controlled deceleration based on various criteria are discussed herein.

In various examples, a vehicle computing system may execute a deceleration determination system that may determine or receive a trajectory for operating a vehicle in an environment, where the trajectory includes a region of travel for a vehicle and, in some examples, a stopping point along the region of travel. This trajectory may be provided to the deceleration determination system by a trajectory determination system (e.g., that may, in some examples, also be executed by the vehicle computing system). In various examples, one or more trajectory determination systems associated with particular types of trajectories may provide trajectories to the deceleration determination system for the determination of deceleration data. In some examples, these one or more trajectory determination systems may be configured with the deceleration determination system in a vehicle trajectory system. The vehicle trajectory system may be configured to provide a trajectory to a tracking system and/or planning system for use in controlling the vehicle. The vehicle trajectory system may determine, from the various trajectories that may be determined by associated trajectory determination systems and the deceleration determination system, a particular trajectory to provide to a tracking system and/or planning system. For example, a vehicle trajectory system may include a trajectory selection system that may receive one or more trajectories from a trajectory determination system and one or more modified trajectories from a deceleration determination system. The trajectory selection system may determine, from among these received trajectories, a trajectory for use in controlling the vehicle. For example, the trajectory selection system may determine a distance to a potential collision or a distance to an intersection with an object and select the trajectory that will stop the vehicle within that distance. In various examples, the various trajectory determination systems, deceleration determination systems, and trajectory selection systems described herein may be configured separately and to interoperate to determine one or more trajectories.

A trajectory may include a lateral profile representing directional parameters (e.g., steering controls) and/or a longitudinal profile representing velocity parameters (e.g., acceleration, deceleration, and/or braking controls). In some examples, a trajectory may include a planned, expected, or otherwise known stopping point, such as at a stop sign or a passenger drop-off area. Alternatively, a trajectory may not include a stopping point and may instead be associated with continuous vehicle travel through a region of travel.

In various examples, a detected event, such as the detection of an obstacle in the vehicle's region of travel in the environment or the detection of a vehicle malfunction, may introduce a need to stop a vehicle unexpectedly. In some cases, this unexpected stopping may be urgent, for example to avoid an imminent potential collision with an obstacle. In other cases, unexpected stopping may be non-urgent and associated with avoiding a non-imminent or less imminent potential collision. For example, a pedestrian or vehicle suddenly entering the path of travel of a vehicle relatively near the leading surface of the vehicle may introduce a need for urgent stopping. In another example, a pedestrian or vehicle entering the path of travel of a vehicle relatively distant from the leading surface of the vehicle may introduce a need for non-urgent stopping.

A deceleration determination system may determine one or more deceleration controls for an urgent deceleration trajectory that may be used to address imminent potential collision situations or other situations where a vehicle may be controlled to stop in relatively short distances. The deceleration determination system may also, or instead, determine one or more deceleration controls for a non-urgent deceleration trajectory that may be used to address non-imminent potential collision situations. The deceleration determination system may determine such deceleration controls based on a trajectory and/or one or more deceleration parameters. The deceleration determination system may also, or instead, determine one or more implementation points along the region of travel represented in a trajectory with which to associate the deceleration controls. An implementation point may be a temporal and/or spatial point along the region of travel represented in the trajectory at which an associated control may be implemented at the vehicle.

The deceleration determination system may modify the received trajectory to include the determined deceleration controls and/or associated implementation points by modifying current longitudinal profile data in the trajectory to include data representing such controls and/or implementation points. Of course, in at least some examples, lateral controls may be implemented in addition to, or alternative to, the longitudinal modifications. In various examples, the deceleration determination system may not modify other portions of the trajectory, for example, maintaining the lateral profile of the received trajectory. Alternatively or additionally, the deceleration determination system may determine or generate another trajectory based on the received trajectory that includes data representing such controls and/or implementation points as well as the (e.g., same) lateral profile data and/or other data from the received trajectory. The deceleration determination system may provide the modified or newly determined trajectory with the determined deceleration controls and/or associated implementation points to another system operated by the vehicle computing system, such as a trajectory selection system. A trajectory selection system may determine, from among one or more trajectories received from the deceleration determination system, one or more trajectory determination systems, and/or one or more other systems, a particular trajectory for use in controlling the vehicle. In some examples, the deceleration determination system may instead, or also, provide or otherwise output data representing the determined deceleration controls and/or their implementation points (e.g., rather than a complete trajectory), for example, to another system that may determine one or more trajectories based on such data.

In various examples, a deceleration determination system may determine deceleration data, longitudinal profile data, and/or modifications thereof for various types of trajectories. In various examples, the deceleration determination system may receive or determine a trajectory that includes operational controls and other data associated with a planned path of vehicle travel through an environment. The deceleration determination system may determine deceleration controls for a modified trajectory that may be associated with a non-urgent unplanned stopping point (e.g., determined based on a detection of a vehicle malfunction, a detection of relatively distant obstacle, a non-imminent potential collision, a non-imminent potential intersection with an object, a non-urgent emergency condition, an intersection probability that a vehicle and an object will intersect is less than a threshold, an intersection distance between a vehicle and an object is greater than a threshold, an intersection time associated with an potential collision greater than a threshold amount of time, etc.). The deceleration determination system may also, or instead, determine deceleration controls for a modified trajectory that may be associated with an urgent stopping point (e.g., determined based on a detection of a relatively near obstacle, an imminent potential collision, an imminent potential intersection with an object, an emergency condition, an intersection probability that a vehicle and an object will intersect is less than a threshold, an intersection distance between a vehicle and an object is less than a threshold, an intersection time associated with an potential collision less than a threshold amount of time, etc.). The deceleration determination system may determine deceleration data for multiple such trajectories substantially simultaneously and/or in parallel so that such trajectories may be available to a vehicle computing system (e.g., a trajectory selection system) for use in controlling a vehicle under various conditions.

In various examples, the deceleration determination system may also, or instead, determine deceleration data for one or more trajectories as described herein repeatedly to substantially continuously determine such trajectories. The deceleration determination system may also, or instead, provide deceleration data for one or more trajectories and/or provide one or more modified trajectories updated with deceleration data to a vehicle computing system substantially continuously so that the vehicle computing system (e.g., always) has one or trajectories for use in controlling a vehicle. For example, deceleration data may be determined for trajectories as such trajectories are determined, for example, substantially continuously and/or incrementally at particular time periods (e.g., every 100 milliseconds, 0.5 seconds, etc.). Alternatively, or in addition, deceleration data may be determined for trajectories as such trajectories are determined based on changes in environmental, operational, and/or vehicle conditions (e.g., change in vehicle speed, change in vehicle acceleration, object detection, change in light conditions, change in weather conditions, selection of a different trajectory type, etc.). As will be discussed in detail herein, such deceleration profiles may be determined iteratively based on, for example, determining an ideal stopping distance and numerically iterating an optimization schema to determine the ideal deceleration. By using current and/or updated trajectories that include deceleration data determined as described herein, the disclosed systems and techniques may increase passenger comfort and operational safety of a vehicle traveling in an environment by decelerating the vehicle using a minimal deceleration while retaining directional control of the vehicle.

In various examples, the deceleration determination system may determine deceleration data for a trajectory (e.g., deceleration controls and/or associated implementation points) based on one or more deceleration parameters and/or criteria. Such parameters may be determined based on vehicle capabilities and/or condition, component capacities and/or condition, one or more vehicle and/or component configurations, and/or a received trajectory. For example, the deceleration determination system may use a current vehicle position, a current vehicle velocity, a type of deceleration associated with the trajectory (e.g., urgent, non-urgent, etc.), estimated vehicle positions at one or more times (e.g., based on velocity, acceleration, etc.), minimum permitted acceleration (e.g., maximum permitted deceleration), minimum and/or maximum rate of change of acceleration (may be referred to as "jerk" or "jolt"), a minimum (e.g., temporal and/or spatial) distance between trajectory points, a duration of time for control implementation (e.g., a period of between a control command issuance and a responsive reaction from a vehicle; may be referred to "reaction duration"), and/or one or more search algorithm parameters (e.g., binary search algorithm parameters) associated with a determination of deceleration data for a trajectory. Any one or more other parameters that may be used by a deceleration determination system to determine deceleration controls, associated implementation points, and/or any other deceleration and/or longitudinal profile data are contemplated as within the scope of the instant disclosure.

In some examples, a deceleration determination system may maintain and/or receive deceleration parameter data associated with a vehicle (e.g., rather than, or in addition to, being associated with a particular trajectory), such as minimum and/or maximum acceleration capabilities and/or minimum and/or maximum stopping distances (e.g., based on velocity, braking system capabilities and/or conditions, motor capabilities and/or conditions, road surface, environmental and/or weather conditions, etc.). Other parameters associated with the vehicle and/or any other system, subsystem, or component other than a trajectory may also, or instead, be used by a deceleration determination system to determine deceleration controls, associated implementation points, and/or any other deceleration and/or longitudinal profile data.

The deceleration determination system may use such parameters to determine one or more deceleration controls for a received trajectory and/or to determine one or more implementation points as which one or more deceleration controls are to be implemented. For example, the deceleration determination system may determine deceleration controls that adjust the vehicle's acceleration (e.g., decelerate) by particular amount of acceleration at particular increments along the region of travel. The deceleration determination system may use the available deceleration parameters to determine the appropriate increments of acceleration change (e.g., deceleration controls) and implementation points for implementing such changes. Detailed examples of such determinations are provided below.

The systems and techniques described herein may be directed to leveraging trajectory data, detection data, and/or deceleration parameters and other data to enable a vehicle, such as an autonomous vehicle, to more accurately determine a vehicle trajectory that may include deceleration controls for improved vehicle control and operational safety, facilitating safer navigation through an environment and improved vehicle control in during the implementation of vehicle deceleration. In particular examples, the systems and techniques described herein can utilize data structures containing data representing a predicted region of travel, current and/or predicted positions of a vehicle and/or objects in an environment, environmental and/or vehicle conditions, lateral and/or longitudinal profiles, and/or any other trajectory data and/or associated data. By using the deceleration determination techniques described herein to more accurately determine deceleration data for a trajectory that may be used as an operational trajectory, the examples described herein may result in increased safety and accuracy of vehicle control, especially vehicle stopping operations, thereby allowing an autonomous vehicle to more safely operate in an environment. For example, the techniques described herein may be faster and/or more robust than conventional techniques, as they may increase the ability of an autonomous vehicle to safely navigate in an environment and more smoothly implement deceleration operations to reach a stopping point (which may, in turn, provide more comfortable rider experiences while ensuring safe operation of the vehicle). That is, techniques described herein provide a technological improvement over existing vehicle trajectory and deceleration determination technology.

The techniques described herein may also improve the operation of computing systems and increase resource utilization efficiency. For example, computing systems, such as vehicle computing systems, may more efficiently perform trajectory and deceleration determinations using the techniques described herein because the disclosed examples may reduce the amount of trajectory data needed to represent a various types of trajectories (e.g., by using the same lateral trajectory profile for multiple trajectories) and reduce the amount of processing required to determine deceleration controls for multiple trajectories by off-loading deceleration determinations to a deceleration determination system from one or more trajectory determination systems. Furthermore, computing systems, such as vehicle computing systems, may more efficiently perform trajectory and deceleration determination operations and the calculations required to determine an operational trajectory by maintaining updated deceleration data and associated trajectories for a variety of situations, thereby requiring less processing to determine an operational trajectory under particular conditions than would be required using conventional techniques where a trajectory and its associated deceleration controls are generated in response to various conditions.

The systems and techniques described herein can be implemented in a number of ways. Example implementations are provided below with reference to the following figures. Although the disclosed techniques may be discussed in the context of an autonomous vehicle, the techniques described herein can be applied to a variety of systems (e.g., a semi-autonomous vehicle, a manually operated vehicle, a sensor system, a robotic platform, etc.) and are not limited to autonomous vehicles. In another example, the techniques can be utilized in an aviation or nautical context, or in any system involving vehicle or object trajectories and/or deceleration control and/or implementation point determination operations. Further, although aspects of the disclosed systems and techniques may be discussed in the context of originating with particular types of sensor data and processing with particular types of components, data and data structures as described herein can include any two-dimensional, three-dimensional, or multi-dimensional data and data associated with any types of sensors (e.g., cameras, lidar, radar, sonar, time-of-flight, and the like). Additionally, the systems and techniques described herein can be used with real data (e.g., captured using sensor(s)), simulated data (e.g., generated by a simulator, training data, and the like) or any combination of thereof.

Figure 2:
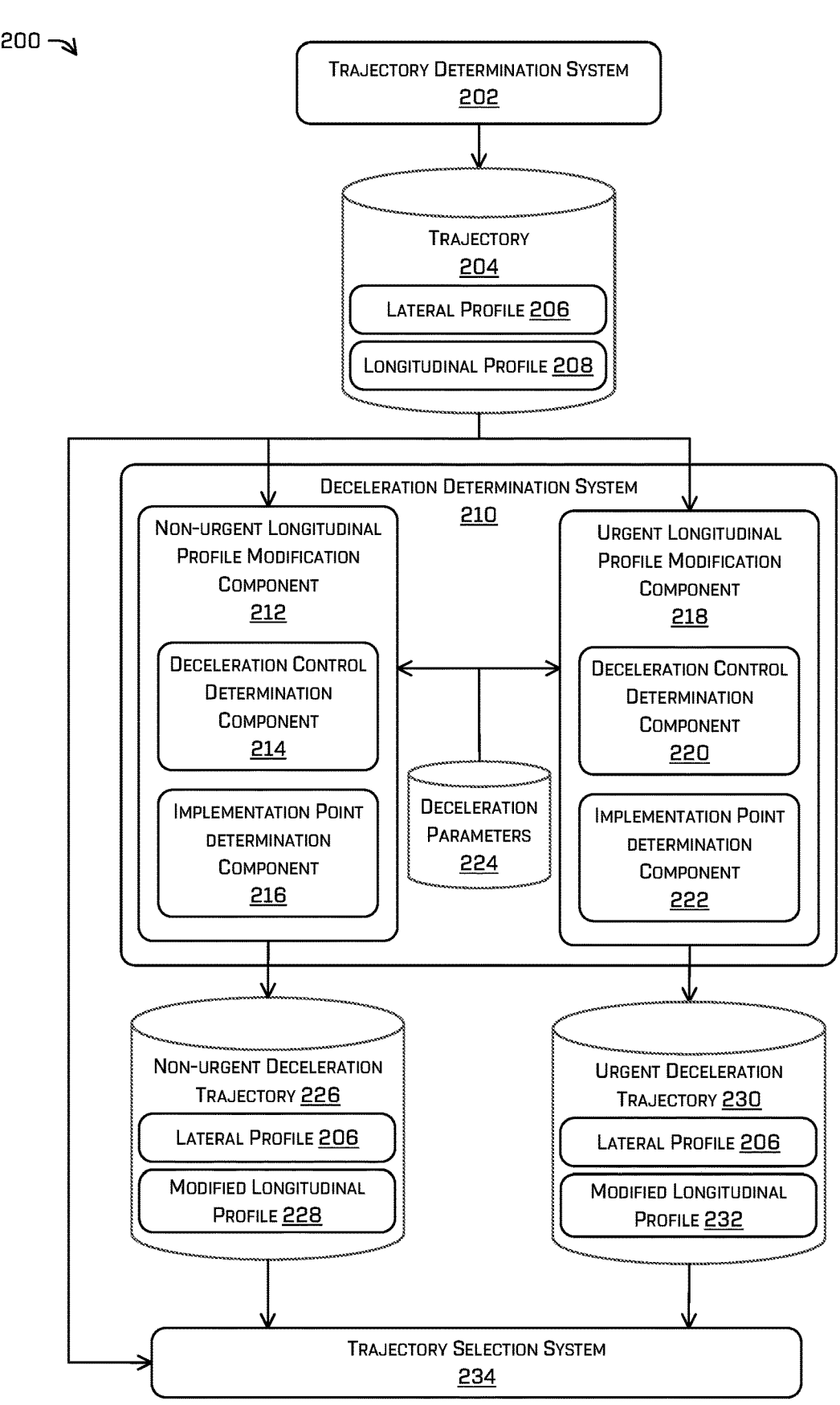
FIG. 2 is a block diagram of an example trajectory determination system, in accordance with examples of the disclosure.
Figure 6:
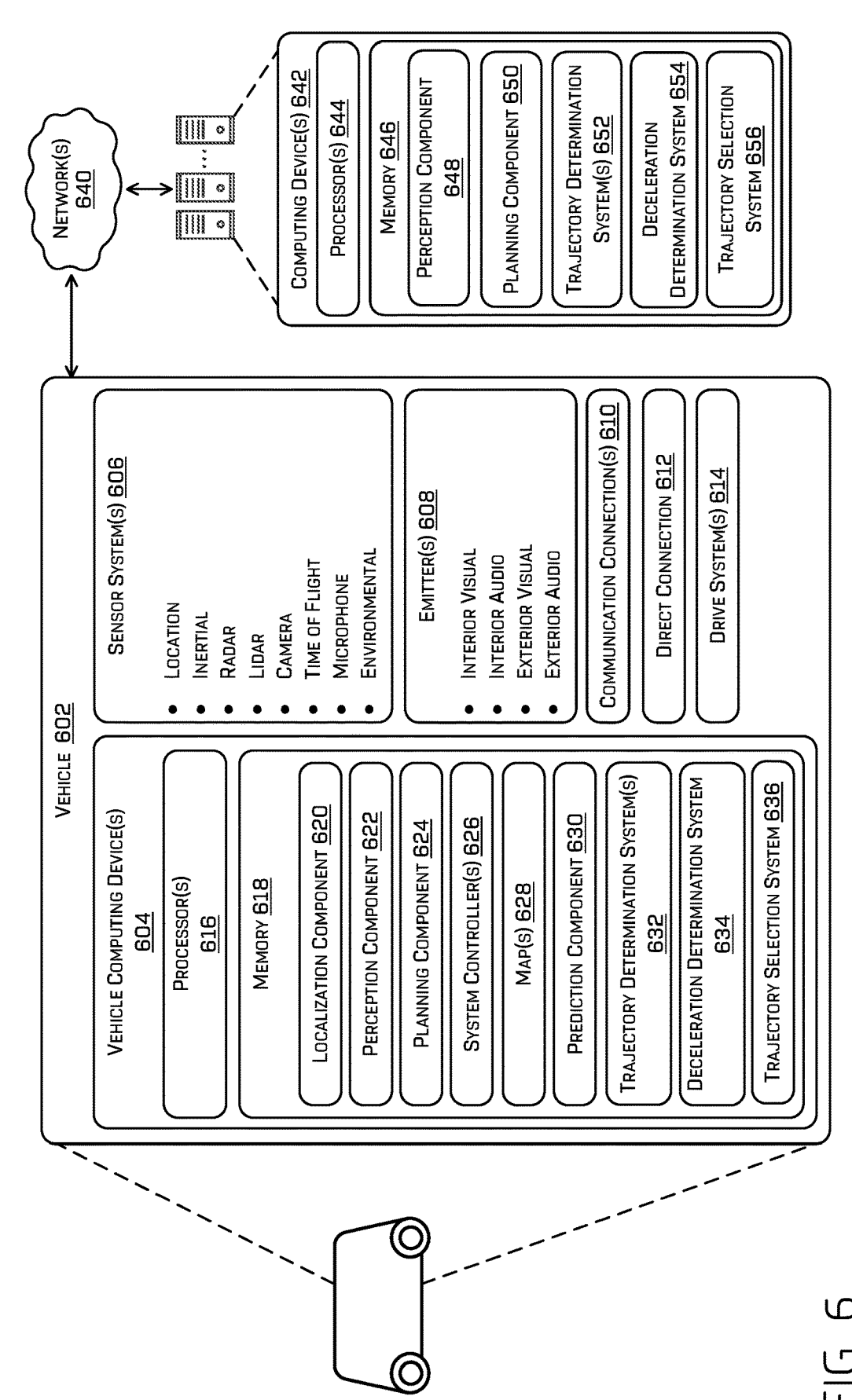
FIG. 6 depicts a block diagram of an example system for implementing the techniques described herein.

FIG. 1 is a pictorial flow diagram of an example process 100 for determining a deceleration data for a vehicle trajectory and providing a trajectory for use in controlling a vehicle. In examples, one or more operations of the process 100 may be implemented by a vehicle computing system, such as by using one or more of the components and systems illustrated in FIGS. 2, 3, and 6 and described below. For example, one or more components and systems can include those associated with vehicle trajectory system 200 illustrated in FIG. 2, trajectory determination system 316, deceleration determination system 318, and/or trajectory selection system 320 illustrated in FIG. 3, and/or processors 616 and/or 644, memories 618 and/or 646, trajectory determination system(s) 632, deceleration determination system 634, and/or trajectory selection system 636 illustrated in FIG. 6. In examples, the one or more operations of the process 100 may be performed by a remote system in communication with a vehicle, such as trajectory determination system 652, deceleration determination system 654, and/or trajectory selection system 656 illustrated in FIG. 6. In still other examples, the one or more operations of the process 100 may be performed by a combination of a remote system and a vehicle computing systems. However, the process 100 is not limited to being performed by such components and systems, and the components and systems of FIGS. 2, 3, and 6 are not limited to performing the process 100.

At operation 102, a deceleration determination system, for example executing at or in communication with a vehicle computing system, may determine or otherwise receive a vehicle trajectory for use in controlling a vehicle traveling in an environment. This trajectory may include data indicating an intended and/or predicted region of travel for the vehicle in the environment, a position (e.g., a current position) of the vehicle in the environment, and one or more vehicle controls, such as steering controls, acceleration controls, braking controls, and/or other vehicle control information that may be used by the vehicle computing system to control the vehicle. Trajectory data may include lateral profile data representing directional parameters (e.g., steering controls) and/or longitudinal profile data representing velocity parameters (e.g., acceleration, deceleration, and/or braking controls). In various examples, a trajectory may also include vehicle, operational, and/or environmental condition data and/or detection data (e.g., associated with one or more objects and/or features detected within the environment). The trajectory received at operation 102 may be based on a planned route or path of travel and may not include deceleration controls for controlling a vehicle in response to detections of unexpected obstacles or unplanned conditions.

An example 104 illustrates a top-down view of an environment in which a vehicle 106 may be traveling. The vehicle 106 may be traveling in the direction indicated by the dashed arrow, towards an object 108 (e.g., a dog) and an object 110 (e.g., another vehicle). A trajectory determination system executed at the vehicle 106 (e.g., by a vehicle computing system configured at the vehicle 106) may determine a trajectory 112 (lateral and longitudinal profile represented as 112 in this example) that may be an initial trajectory of controlling the vehicle 106 under normal conditions. For example, the initial trajectory 112 may be based on a planned route or path of travel. While the trajectory 112 may include deceleration controls for planned stops, it may not include deceleration controls for addressing unexpected obstacles or unplanned conditions that may require deceleration. For instance, the trajectory 112 may not include deceleration controls determined for use in response to an emergency condition and/or a detection of a potential intersection or collision (e.g., that may not have been detected, for example, when generating the initial trajectory due to changed environmental conditions, errors in one or more systems or subsystems, and the like).

For example, one or more sensors at the vehicle 106 may have detected the sudden and unexpected arrival of the dog 108 in the region of travel of the vehicle 106. In response, as described in more detail herein, the vehicle computing system may determine the trajectory 112 does not include deceleration controls that stop the vehicle 106 before intersecting the position of the dog 108 and may, in response determine to use an alternate and/or modified deceleration trajectory (e.g., an urgent trajectory) in an effort to avoid colliding with the dog 108.

Similarly, one or more sensors at the vehicle 106 may have detected the unexpected arrival of the vehicle 110 in the region of travel of the vehicle 106. In response, as described in more detail herein, the vehicle computing system may determine the trajectory 112 does not include deceleration controls that stop the vehicle 106 before intersecting the position of the vehicle 110 and may, in response determine to use an alternate and/or modified deceleration trajectory (e.g., a non-urgent trajectory) in an effort to avoid colliding with the vehicle 110. As described in more detail herein, in various examples, a vehicle computing system may determine one or more modified or alternate trajectories to use in response to an unexpected condition based on criteria such as a distance to stop associated with the available trajectories and a distance to intersection with an obstacle.

The trajectory determination system of the vehicle 106 may provide the initial trajectory 112 to a deceleration determination system for determination of deceleration data for the longitudinal profile of one or more trajectories that may be based on the trajectory 112. In some examples, such trajectories may be modified versions of the trajectory 112 that include longitudinal data determined by the deceleration determination system and retain lateral profile data of the trajectory 112 and/or other parameters of the trajectory 112.

The trajectory 112 may include any one or more of the parameters (e.g., deceleration parameters) that the deceleration determination system may use to determine deceleration data for one or more modified trajectories determined based on the trajectory 112. In various examples, the deceleration determination system may determine deceleration data for an urgent deceleration trajectory, a non-urgent deceleration trajectory, and/or similar trajectories that may be used by a vehicle computing system to control the vehicle 106 in response to detecting a potential collision or other urgent or emergency condition.

At operation 116, the deceleration determination system may determine one or more parameters that it may use to determine the deceleration data for the trajectory received at operation 102. For example, the deceleration determination system may determine, based on the received trajectory, a current vehicle position, a current vehicle velocity, a type of deceleration associated with the trajectory (e.g., urgent, non-urgent, etc.), estimated or predicted vehicle positions at one or more times (e.g., based on velocity, acceleration, etc.), minimum/maximum permitted acceleration, minimum/maximum jerk rate, minimum distance between trajectory points, reaction duration, search algorithm parameters, etc. The deceleration determination system may instead, or also, determine deceleration parameters from one or more sources other than the received trajectory, such as vehicle capability and/or condition data, environmental condition data, weather condition data, deceleration determination system configurations, etc.

At operation 118, the deceleration determination system may determine one or more deceleration controls and/or associated implementation points for the longitudinal profile of the received trajectory. For example, the deceleration determination system may determine a particular amount of deceleration to apply at individual points along the region of travel represented in the trajectory. The trajectory may then be used by a vehicle computing system to stop the vehicle at a stopping point. In various examples, the deceleration determination system may not alter or modify the lateral profile of the trajectory in determining deceleration controls, though such modifications are contemplated in additional or alternate examples.

For example, the deceleration determination system may use a binary search algorithm to determine a deceleration value for one or more deceleration controls at one or more points along the region of travel between the vehicle's current position and a stopping point. In performing this binary search, the deceleration determination system may use an iteration parameter (e.g. representing a maximum number of allowed iterations) to determine a maximum number of iteration for which to perform this binary search algorithm. The deceleration determination system may also use an acceleration tolerance parameter (e.g. representing a maximum tolerated acceleration) to determine deceleration value(s) for one or more points along the region of travel using the binary search algorithm. For example, the deceleration determination system may determine an initial deceleration for a particular implementation point along the region of travel and then determine whether the determined initial deceleration falls within the parameters associated with the trajectory that bound the available deceleration values (e.g., minimum deceleration, jerk limit, etc.). The deceleration determination system may then adjust the initial deceleration for the particular implementation point based on the parameters. For example, the deceleration determination system may decrease the deceleration to fall within the bounds associated with such bounding parameters or increase the deceleration if the initial deceleration is (e.g., sufficiently) within the bounding parameters. In some examples, the deceleration determination system may perform multiple iterations of this search process until the number of iterations equals the iteration parameter value, a change in deceleration value or resultant distance is less than or equal to some threshold change, and/or any other stopping criteria is met. In various examples, this search/optimization for a deceleration value may utilize a binary search method. In such examples, the deceleration value may be continuously increased and/or decreased based on the resultant distance to stop as compared to a desired distance to stop. In various such examples, an amount the deceleration is changed upon each iteration may be reduced such that the change in deceleration is smaller upon each subsequent iteration.

The deceleration determination system may also, or instead, use a minimum acceleration parameter to set a bound on the determined deceleration controls. For example, the deceleration determination system may perform operations to determine deceleration controls that will decelerate the vehicle by no more than the value of the minimum acceleration parameter (e.g., representing maximum permitted deceleration). The minimum acceleration parameter may represent a minimum acceleration at which the vehicle may remain reliably and safely controllable (e.g., under various road and/or environmental conditions).

The deceleration determination system may also, or instead, use a minimum jerk parameter to set a bound on the amount of change of deceleration represented by proximate determined deceleration controls. For example, the deceleration determination system may perform operations to determine deceleration controls such that the deceleration represented by consecutive deceleration controls may not vary by an amount of deceleration greater than the value of the minimum jerk parameter representing a maximum permitted change in deceleration (e.g., 0.5 meters per second cubed $(m/s^3)$, 1 $m/s^3$, 1.5 $m/s^3$, etc.). A rapid change in deceleration may affect the ability to reliably control the vehicle and may cause passenger discomfort due to rapid slowing. The use of a jerk limit as described herein may help maintain reliable vehicle control and increase passenger comfort in deceleration situations.

The deceleration determination system may also, or instead, use a reaction duration parameter to determine one or more deceleration controls and/or one or more associated implementation points along the region of travel. A reaction duration parameter may be determined from a trajectory and/or from vehicle capability data (e.g., may be associated with one or more vehicle components and/or a current condition of one or more such components). The deceleration determination system may perform operations to determine an implementation point for a particular deceleration control based on a reaction duration parameter such that the deceleration control is implemented in time to bring the vehicle to a stop. In other words, the deceleration determination system may take into account the amount of time between issuing an instruction to implement the deceleration control and the responsive implementation of the control by the vehicle in determining an implementation point along the region of travel. In various embodiments, a reaction duration may vary depending on the associated control and/or one or more other conditions. For example, a deceleration control that includes applying brakes and that occurs after a deceleration control that also include applying the brakes may have a shorter reaction duration than a deceleration control that includes applying brakes for the first time within in some time period. For instance, if the brakes are already applied based on a prior deceleration control, there may be less of a reaction duration for a subsequent further application of the brakes than if the brakes were not already applied.

The deceleration determination system may also, or instead, use a desired nominal acceleration parameter to determine one or more deceleration controls and/or implementation points. For example, the deceleration determination system may determine that nominal deceleration control may be sufficient to bring the vehicle to a stop and therefore may perform operations to determine deceleration controls that will decelerate the vehicle using deceleration values associated with the nominal acceleration parameter to provide improved passenger comfort and smoother vehicle performance. The nominal acceleration parameter may represent a nominal acceleration at which the vehicle may be comfortably and reliably controllable (e.g., more comfortable for passengers than deceleration at the minimum acceleration value). In at least some examples, such deceleration values may be substantially similar to those provided in the initially received stopping trajectory in the event that such a trajectory contemplated stopping the vehicle.

The deceleration determination system may also, or instead, use a current vehicle position parameter and a stopping point parameter, for example to determine the distance to stop for the trajectory. The deceleration determination system may also, or instead, use a stopped velocity parameter to determine one or more deceleration controls and/or implementation points. For example, the vehicle may be very slowly or slightly in motion, or may be detected as such, while still being considered to be "stopped." The deceleration determination system may also, or instead, use a type of trajectory parameter to determine one or more deceleration controls and/or implementation points. For example, the deceleration determination system may determine deceleration controls and/or implementation points based on whether they are intended for an urgent stopping point trajectory or a non-urgent stopping point trajectory.

In order to determine a location (e.g., temporal and/or spatial) for one or more implementation points along a region of travel at which deceleration controls are to be implemented, the deceleration determination system may use a minimum inter-point distance parameter that represents a minimum temporal and/or spatial distance required between individual implementation points. For example, this parameter may indicate a temporal distance as a time value (e.g., 100 milliseconds (ms), 200 ms, etc.), requiring that the deceleration determination system configure the longitudinal profile data of the trajectory to have a time period of vehicle travel of at least that time value between consecutive deceleration control implementations. Alternatively or additionally, a minimum inter-point distance parameter may indicate a physical distance value (e.g., 1 meter (m), 2 m, 5 m, etc.), requiring that the deceleration determination system configure the longitudinal profile data of the trajectory to have a physical distance of vehicle travel of at least that physical distance between consecutive deceleration control implementations.

In various examples, the deceleration determination system may determine implementation points along a trajectory that correspond to points configured in the trajectory as received. For example, a trajectory may include discrete temporal and/or spatial points at which controls may be implemented and/or other actions (e.g., data collection, determinations, etc.) may occur. In some examples, the deceleration determination system may also, or instead, determine implementation points that are distinct from discrete temporal and/or spatial points that may be represented in the trajectory as received by the deceleration determination system.

The deceleration determination system may also, or instead, indicate a point in the modified trajectory (e.g., indicate at an existing point represented in the received trajectory and/or insert a point into the trajectory) at which the vehicle is expected to be stopped using the deceleration controls associated with that trajectory. The deceleration determination system may also, or instead, indicate a point in the modified trajectory (e.g., indicate at an existing point represented in the received trajectory and/or insert a point into the trajectory) at which the deceleration (e.g., nominal acceleration, minimum acceleration) of the vehicle is to begin. The deceleration determination system may also, or instead, indicate a point in the modified trajectory (e.g., indicate at an existing point represented in the received trajectory and/or insert a point into the trajectory) at which a jerk limit has been met by a current deceleration and/or is no longer applicable and a desired deceleration change rate (deceleration "ramp rate") of the vehicle may be implemented. As discussed in detail herein, such determinations may be made iteratively based on modifying the deceleration per iteration to achieve such desired stopping points while adhering to the jerk limits. Such a search may be performed as a binary search in various examples.

At operation 120, the deceleration determination system may modify the received initial trajectory's longitudinal profile to include the determined one or more deceleration controls and/or implementation points. The deceleration determination system may not make modifications to other portions of the trajectory, such as the lateral profile. Alternatively or additionally, the deceleration determination system may generate or otherwise determine a new trajectory based on the received initial trajectory by determining the new trajectory's longitudinal profile based on the determined one or more deceleration controls and/or implementation points and using the remaining portions of the received trajectory (e.g., lateral profile) for the remaining portions of the new trajectory.

An example 122 illustrates a top-down view of the environment of the example 104 in which the vehicle 106 may be traveling, including the dog 108 and the vehicle 110. The deceleration determination system may modify the initial trajectory 112 of the example 104 to determine the urgent deceleration trajectory 124. Alternatively or additionally, the deceleration determination system may determine the urgent deceleration trajectory 124 based on the initial trajectory 112 of the example 104. Similarly, the deceleration determination system may modify the initial trajectory 112 of the example 104 to determine the non-urgent deceleration trajectory 128. Alternatively or additionally, the deceleration determination system may determine the non-urgent deceleration trajectory 128 based on the initial trajectory 112 of the example 104.

In this example, the deceleration determination system may modify the longitudinal profile data of the trajectory 112 to determine the urgent deceleration trajectory 124 to include the deceleration controls 126 at the implementation points indicated by the dots on the trajectory 124. As described herein, the deceleration controls 126 and/or the associated implementation points may be determined based on one or more deceleration parameters associated with the received trajectory 112 and/or other parameter sources. The deceleration determination system may configure the deceleration controls 126 to, when implemented at the vehicle, cause the vehicle 106 to stop using an urgent deceleration rate (e.g. based on a minimum acceleration parameter, in some examples, in combination with other parameters (e.g., jerk limit, search algorithm parameters, etc.). The urgent deceleration trajectory 124 may also, or instead, include an indication of a stopping point of the vehicle 106 based on the deceleration controls 126, an indication of a deceleration initiation point, and/or an indication of a deceleration ramping initiation point (e.g., a point at which a jerk limit is no longer applicable).

As also shown in this example, the deceleration determination system may modify the longitudinal profile data of the initial trajectory 112 to determine the modified non-urgent deceleration trajectory 128 to include the deceleration controls 130 at the implementation points indicated by the dots on the trajectory 128. As described herein, the deceleration controls 130 and/or the associated implementation points may be determined based on one or more deceleration parameters associated with the received trajectory 112 and/or other parameter sources. The deceleration determination system may configure the deceleration controls 130 to, when implemented at the vehicle, cause the vehicle 106 to stop using a non-urgent deceleration rate (e.g., based on a nominal acceleration parameter), in some examples, in combination with other parameters (e.g., jerk limit, search algorithm parameters, etc.). The non-urgent deceleration trajectory 128 may also, or instead, include an indication of a stopping point of the vehicle 106 based on the deceleration controls 130, an indication of a deceleration initiation point, and/or an indication of a deceleration ramping initiation point (e.g., a point at which a jerk limit is no longer applicable). As shown in this example, the deceleration controls 130 may be spaced further apart in distance and/or time along the region of travel associated with the trajectory 128 than the deceleration controls 126 of the trajectory 124, allowing for a more gradual deceleration when the vehicle is operated using the non-urgent deceleration trajectory 128 than when the vehicle is operated using the urgent deceleration trajectory 124.

At operation 132, the deceleration determination system may provide the modified and/or determined trajectory, including one or more determined deceleration controls and/or implementation points, to a trajectory selection system. This trajectory selection system may select from among one or more available trajectories, that may include the modified trajectory, a particular trajectory to provide to a tracking and/or planning system and/or to otherwise use to control a vehicle. For example, the trajectory, as modified at operation 120, may be included among one or more trajectories generated or otherwise provide to the trajectory selection system from which the trajectory selection system my determine a trajectory to provide to a tracking system and/or planning system.

In various examples, the operations of the process 100 may be performed within an individual vehicle trajectory system that determines a trajectory (e.g., from among one or more generated or determined trajectories) to provide to a tracking system and/or planning system. Alternatively or additionally, the operations of the process 100 may be performed by multiple individual trajectory-related systems that determine and/or provide trajectories for determination as a selected trajectory for vehicle control and/or to provide to a tracking system and/or planning system.

FIG. 2 is a block diagram of an operational trajectory determination system 200 according to various examples. The system 200 may be implemented at a vehicle (e.g., an autonomous vehicle) by a vehicle computing system and/or by a remote system. The system 200 may include one or more of the components and systems illustrated in FIGS. 3 and 6 and described below. These components may be configured as described herein or in any other configuration and may perform any subset of their associated operations in any or and/or in conjunction with other one or more other operations. For example, one or more components and systems can include and/or be implemented using trajectory determination system 316, deceleration determination system 318, and/or trajectory selection system 320 of FIG. 3 and/or processors 616 and/or 644, memories 618 and/or 646, trajectory determination system(s) 632, deceleration determination system 634, and/or trajectory selection system 636 of FIG. 6. In some examples, one or more operations performed by the system 200 may be implemented as a combination of a components at a remote system and a vehicle computing system, such as trajectory determination system(s) 652, deceleration determination system 654, and/or trajectory selection system 656 of FIG. 6. However, the system 200 is not limited to being performed by such components and systems, and the components and systems of FIGS. 3 and 6 are not limited to implementing the system 200.

In various examples, a vehicle trajectory system 200 may be configured at a vehicle and may include multiple trajectory determination systems or subsystems that may be individually configured to determine and/or generate multiple types of trajectories. For example, the vehicle trajectory system 200 may include a trajectory determination system 202. The vehicle trajectory system 200 may be further configured to determine, from among such multiple trajectories, a trajectory to provide to a tracking and/or planning system for use in control of a vehicle. For example, the vehicle trajectory system 200 may determine, using a deceleration determination system as described herein, multiple trajectories including updated deceleration data. The vehicle trajectory system 200 may then determine from among such trajectories (e.g., using a trajectory selection system) an individual trajectory to provide to a tracking and/or planning system and/or to otherwise use for vehicle control. Alternatively, the vehicle trajectory system 200 may provide all or a subset of such trajectories to a tracking and/or planning system.

The trajectory determination system 202 may generate or otherwise determine one or more data structures representing a trajectory 204 associated with controlling a vehicle under normal conditions. For example, the trajectory 204 may be used to control a vehicle along a path of travel and may include planned acceleration and/or deceleration controls (e.g., driving through an environment, slowing to stop at a stop sign, slowing to stop for passenger drop-off, slowing to a stop due to a non-emergency vehicle malfunction, etc.). The trajectory 204 may include a lateral profile 206 that may include data representing directional parameters (e.g., steering controls, region of travel, etc.). The trajectory 204 may also, or instead, include a longitudinal profile 208 that may include data representing velocity parameters (e.g., acceleration, deceleration, and/or braking controls). In various examples, the longitudinal profile 208 and/or the deceleration trajectory 204 may include an indication of a current position of a vehicle and/or a stopping point. The trajectory 204 may also, or instead, include data that may be used by a deceleration determination system as deceleration parameters, such as, but not limited to, data representing a current vehicle velocity, a type of deceleration, estimated or predicted vehicle positions at one or more times, minimum/maximum permitted acceleration, minimum/maximum jerk rate, minimum inter-point distance, reaction duration, search algorithm parameters, etc.

The trajectory determination system 202 may provide the trajectory 204 to a deceleration determination system 210 for deceleration data determination. The deceleration determination system 210 may use the deceleration parameters associated with the received trajectory 204 to modify a longitudinal profile 208 of the received trajectory 204 with deceleration controls. For example, a non-urgent longitudinal profile modification component 212 may receive the trajectory 204 and determine one or more deceleration parameters based on the trajectory and/or one or more non-urgent deceleration parameters, such as a nominal acceleration parameter. The non-urgent longitudinal profile modification component 212 may also, or instead, determine or obtain one or more deceleration parameters 224 from one or more sources other than the trajectory 204 (e.g., from one or more other vehicle computing system components and/or data sources, such as vehicle capability and/or condition data, environmental condition data, weather condition data, etc.).

A deceleration control determination component 214 may use such parameters to determine particular controls to be implemented at a vehicle to slow the vehicle at a non-urgent deceleration rate along the path of travel indicated in the trajectory 204. An implementation point determination component 216 may use such parameters to determine and/or insert particular temporal and/or spatial points along a region of travel associated with the trajectory 204 at which the controls determined by the deceleration control determination component 214 may be implemented. As will be appreciated, the operations performed by the components may be interrelated and may be performed by a single component providing the combined functionality of the deceleration control determination component 214 and the implementation point determination component 216.

For example, the deceleration control determination component 214 may determine, based on parameters such as a minimum jerk parameter, a maximum deceleration parameter, a nominal acceleration parameter, etc., that a particular number of incremental deceleration increases of a particular amount of deceleration may be used to decelerate the vehicle and ultimately to bring the vehicle to a stop at a particular stopping point (e.g., five deceleration increases of −1 m/s² per increase). The deceleration control determination component 214 may also determine the particular vehicle controls associated with achieving such deceleration increases. As described above, a binary search algorithm may be used to make these determinations, for example using search algorithm parameters as disclosed herein (e.g., a candidate deceleration value may be determined, a stopping distance/point may be determined relative to an object in an environment, and a new candidate deceleration may be determined to converge at an optimal deceleration value). In various such examples, the change in deceleration may be reduced for each successive iteration. Iteration may stop based on one more stopping criteria, such as, for example, number of iterations, change in deceleration, change in stopping point, rate of change of deceleration, etc. The implementation point determination component 216 may determine the times, locations, and/or discrete points in the trajectory at which such deceleration increases may be implemented from the starting time of the trajectory 204 (e.g., every 100 ms from the trajectory starting time).

The deceleration determination system 210 may use the data determined by the deceleration control determination component 214 and the implementation point determination component 216 to modify the longitudinal profile of the received trajectory 204 and/or to generate a new trajectory with such longitudinal profile data that otherwise substantially replicates the remaining data of the received trajectory 204. For example, the deceleration determination system 210 may modify the longitudinal profile 208 of the trajectory 204 based on data determined by the deceleration control determination component 214 and the implementation point determination component 216 to determine a modified longitudinal profile 228 for a non-urgent deceleration trajectory 226. The deceleration determination system 210 may determine the non-urgent deceleration trajectory 226 to include the lateral profile 206 that may be substantially unchanged from the lateral profile of the trajectory 204. The deceleration determination system 210 may provide the non-urgent deceleration trajectory 226 to the trajectory selection system 234, for example, for use as a candidate trajectory from which a trajectory for controlling a vehicle may be determined.

Similarly, the urgent longitudinal profile modification component 218 may receive the trajectory 204 and determine one or more deceleration parameters based on the trajectory and/or one or more urgent deceleration parameters, such as a minimum acceleration parameter. The urgent longitudinal profile modification component 212 may also, or instead, determine or obtain one or more deceleration parameters 224 from one or more sources other than the trajectory 204 (e.g., from one or more other vehicle computing system components and/or data sources, such as vehicle capability and/or condition data, environmental condition data, weather condition data, etc.).

A deceleration control determination component 220 may use such parameters to determine particular controls to be implemented at a vehicle to slow the vehicle at an urgent deceleration rate along the path of travel indicated in the trajectory 204. An implementation point determination component 222 may use such parameters to determine and/or insert particular temporal and/or spatial points along a region of travel associated with the trajectory 204 at which the controls determined by the deceleration control determination component 220 may be implemented. Here again, the operations performed by the components may be interrelated and may be performed by a single component providing the combined functionality of the deceleration control determination component 220 and the implementation point determination component 222.

In examples, the deceleration control determination component 220 may determine, based on parameters such as a minimum jerk parameter, a maximum deceleration parameter, a nominal acceleration parameter, etc., that a particular number of incremental deceleration increases of a particular amount of deceleration may be used to decelerate the vehicle and ultimately to bring the vehicle to a stop at a particular stopping point (e.g., five deceleration increases of −1 m/s² per increase). The deceleration control determination component 220 may also determine the particular vehicle controls associated with achieving such deceleration increases. As described above, a binary search algorithm may be used to make these determinations, for example using search algorithm parameters as disclosed herein. The implementation point determination component 222 may determine the times, locations, and/or discrete points in the trajectory at which such deceleration increases may be implemented from the starting time of the trajectory 204 (e.g., every 100 ms from the trajectory starting time).

The deceleration determination system 210 may use the data determined by the deceleration control determination component 220 and the implementation point determination component 222 to modify the longitudinal profile of the received trajectory 204 and/or to generate a new trajectory with such longitudinal profile data that otherwise substantially replicates the remaining data of the received trajectory 204. For example, the deceleration determination system 210 may modify the longitudinal profile 208 of the trajectory 204 based on data determined by the deceleration control determination component 220 and the implementation point determination component 222 to determine a modified longitudinal profile 232 for an urgent deceleration trajectory 230. The deceleration determination system 210 may determine the urgent deceleration trajectory 230 to include the lateral profile 206 that may be substantially unchanged from the lateral profile of the trajectory 204. The deceleration determination system 210 may provide the urgent deceleration trajectory 230 to the trajectory selection system 234, for example, for use as a candidate trajectory from which a trajectory for controlling a vehicle may be determined.

The trajectory selection system 234 may receive the non-urgent deceleration trajectory 226 and the urgent deceleration trajectory 230 from the deceleration determination system 210, as well as the initial trajectory 204 from the trajectory determination system 202. The trajectory selection system 234 may also, or instead, receive one or more other trajectories of other types from the deceleration determination system 210, the trajectory determination system 202, and/or from one or more other systems. The trajectory selection system may determine, based on detected environmental conditions, vehicle conditions, obstacles detected, sensor data, etc., an operational trajectory from among these candidate trajectories to use for controlling a vehicle. The determined operational trajectory may be provided to a planner, tracker, and/or one or more other vehicle control components.

Figures 3A, 3B:
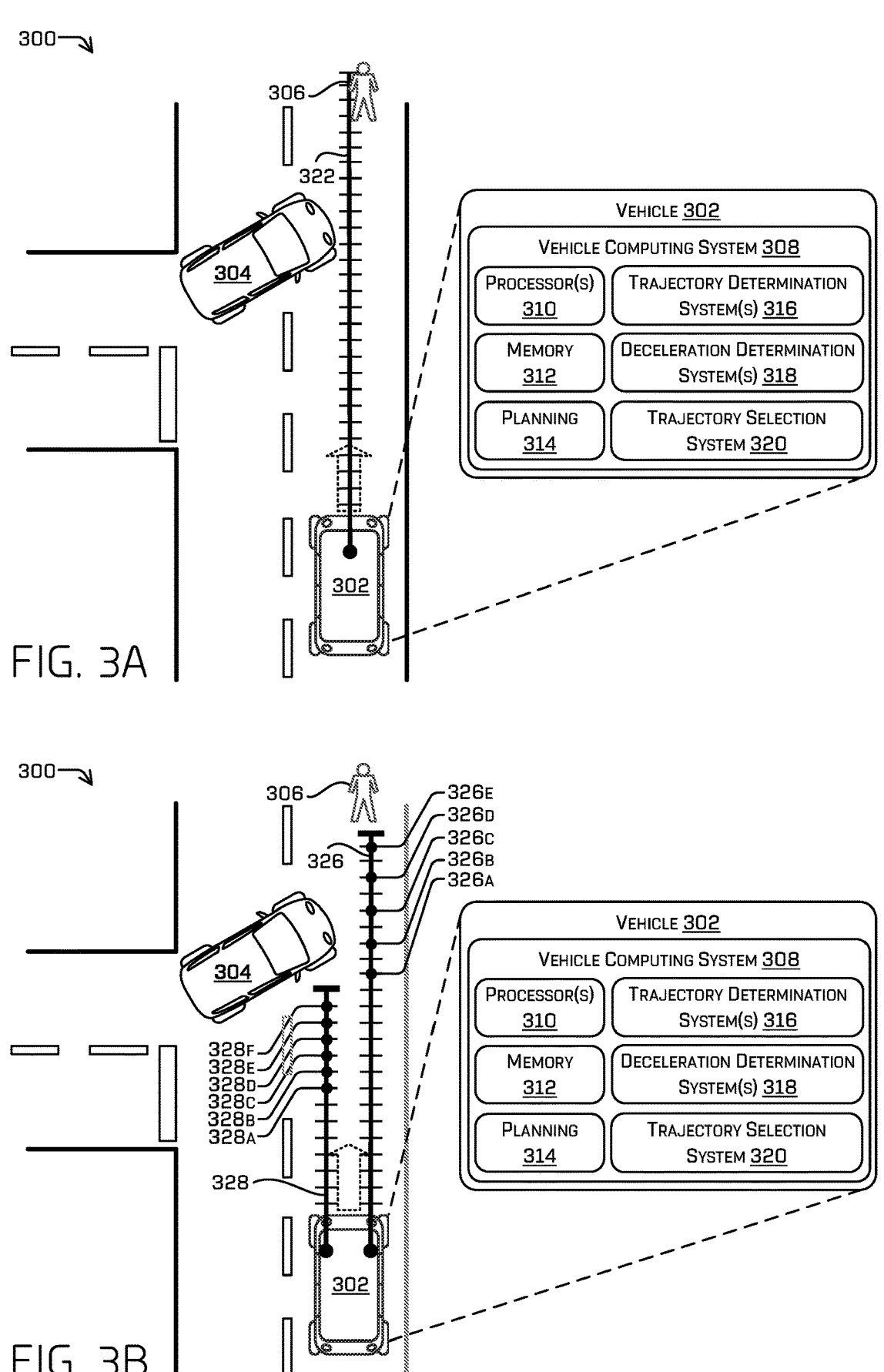
FIGS. 3A-B depict block diagrams representing an example vehicle, environment, trajectories, and deceleration increments, in accordance with examples of the disclosure.

FIG. 3A is a top-down view of an example environment 300 in which a vehicle 302 may be traveling. The vehicle 302 may be configured with a sensor system that may allow a vehicle computing system configured at the vehicle 302 to collect data in the environment 300, detect objects, make various determinations, etc. The vehicle 302 may be sharing a road with other vehicles, such as vehicle 304 that may be entering the lane in which the vehicle 302 is traveling and that the vehicle 302 may detect, for example using sensor data generated by sensor configured at the vehicle 302. The vehicle 302 may also detect other objects in the environment 300, such as a pedestrian 306. The vehicle 302 may be configured with a vehicle computing system 308 that may include one or more processors 310, memory 312, a planning component 314, one or more trajectory determination systems 316, one or more deceleration determination systems 318, and/or a trajectory selection system 320.

The trajectory determination system(s) 316 may determine an initial trajectory 322 for operating the vehicle 302 under normal conditions (e.g., based on a planned route and including controls that may not account for unexpected conditions). The trajectory determination system(s) 316 may provide the trajectory 322 to the deceleration determination system 318 for deceleration data determination and/or deceleration trajectory determination.

As described herein, the deceleration determination system 318 may determine one or more deceleration controls and/or associated implementation points for one or more trajectories using one or more deceleration parameters. For example, the deceleration determination system 318 may use a binary search algorithm to (e.g., based on deceleration parameters) to determine deceleration controls for one or more deceleration rates, such as an urgent deceleration rate and a non-urgent deceleration rate. In various examples, the deceleration determination system 318 may determine an initial deceleration for a particular implementation point along the region of travel and then determine whether the determined initial deceleration falls within the parameters associated with a trajectory type (e.g. urgent deceleration trajectory or non-urgent deceleration trajectory) that bound the available deceleration values (e.g., nominal deceleration, minimum deceleration, jerk limit, etc.). The deceleration determination system 318 may then adjust the initial deceleration for the particular implementation point based on one or more parameters. For example, the deceleration determination system 318 may decrease the deceleration to fall within the bounds associated with such bounding parameters or increase the deceleration if the initial deceleration is (e.g., sufficiently) within the bounding parameters. In some examples, the deceleration determination system 318 may perform multiple iterations of this search process until the number of iterations equals an iteration parameter value. In various examples, such operations may be performed numerically using various jerk limits, wherein subsequent deceleration values along the trajectory are determined as stepwise functions (e.g., time periods associated with constant deceleration values) differing by no more than allowed by the jerk limit. In some such examples, computational resources may be reduced by using such a technique to ensure the vehicle is able to quickly process and respond to various situations.

The deceleration determination system 318 may then determine the incremental deceleration controls needed to implement the deceleration and the implementation points at which such control may be implemented. In various examples, the deceleration determination system 318 may determine implementation points along a trajectory that correspond to points configured in the trajectory 322 as received. For example, the trajectory 322 may include discrete temporal and/or spatial points at which controls may be implemented and/or other actions (e.g., data collection, determinations, etc.) may occur. Alternatively or additionally, the deceleration determination system 318 may determine implementation points that are distinct from discrete temporal and/or spatial points that may be represented in the trajectory 322 and may associate one or more deceleration controls with one or more such points.

The deceleration determination system 318 may also, or instead, indicate a point in a modified trajectory (e.g., a non-urgent deceleration trajectory or an urgent deceleration trajectory) at which the vehicle is expected to be stopped using the deceleration controls associated with that trajectory. The deceleration determination system 318 may also, or instead, indicate a point in the modified trajectory at which the deceleration (e.g., nominal acceleration, minimum acceleration) of the vehicle is to begin (e.g., a point at which a first deceleration control is implemented). The deceleration determination system may also, or instead, indicate a point in the modified trajectory (e.g., indicate at an existing point represented in the received trajectory and/or insert a point into the trajectory) at which a jerk limit has been met by a current deceleration and/or is no longer applicable and a desired deceleration change rate (deceleration "ramp rate") of the vehicle may be implemented.

FIG. 3B is another top-down view of the example environment 300 in which the vehicle 302 may be traveling. In this example, a non-urgent deceleration trajectory 324 represents the trajectory 322 as modified by the deceleration determination system 318 and the urgent deceleration trajectory 328 represents the trajectory 322 as modified by the deceleration determination system 318.

The non-urgent deceleration trajectory 326 may be determined (or modified from trajectory 322) with controls 326*a-e* as shown in this example. For example, the deceleration determination system 318 may determine controls that slow down the vehicle 302 at a non-urgent deceleration rate (e.g., a nominal and/or substantially constant acceleration rate). The deceleration determination system 318 may determine, using a binary search algorithm in some examples, a first deceleration control 326*a* that may be implemented at a first implementation point (e.g., a first time relative to the starting time of the trajectory). The deceleration determination system 318 may further determine a second deceleration control 326*b* that may be implemented at a subsequent implementation point, a third deceleration control 326*c* that may be implemented at a next subsequent implementation point, and so forth until a final deceleration control 326*e* that may be implemented at a final implementation point that bring the vehicle 302 to a stop (e.g., at or near the pedestrian 306) is determined. Because the trajectory 326 may allow for adequate time to stop the vehicle 302 using nominal or preferred (e.g., for passenger comfort) deceleration rates, the implementation points associated with controls 326*a-e* may be relatively spread out, with greater inter-point distances than indicated by a minimum inter-point distance parameter.

The deceleration determination system 318 may also, or instead, determine for the non-urgent deceleration trajectory 326 a point at which the vehicle 302 is expected to be stopped (e.g., 326*e*), a point at which the deceleration of the vehicle 302 is to begin (e.g., 326*a*), and/or a point at which a jerk limit may no longer be applicable and a desired deceleration ramp rate for the vehicle 302 may be implemented.

The urgent deceleration trajectory 328 may be determined (or modified from trajectory 322) with controls 328*a-f* as shown in this example. For example, the deceleration determination system 318 may determine controls that slow down the vehicle 302 at an urgent deceleration rate (e.g., a minimum and/or substantially constant acceleration rate). Similar to trajectory 326, the deceleration determination system 318 may determine, using a binary search algorithm in some examples, a first deceleration control 328*a* that may be implemented at a first implementation point (e.g., a first time relative to the starting time of the trajectory). The deceleration determination system 318 may further determine a second deceleration control 328*b* that may be implemented at a subsequent implementation point, a third deceleration control 328*c* that may be implemented at a next subsequent implementation point, and so forth until a final deceleration control 328*f* that may be implemented at a final implementation point that bring the vehicle 302 to a stop (e.g., at or near the vehicle 304) is determined. Because the trajectory 328 may be associated with the fastest time to stop that allows for safe and reliable control of the vehicle 302, the trajectory 328 may be determined using minimum acceleration (maximum deceleration) rates. Therefore, the implementation points associated with controls 328*a-f* may be relatively proximate to one another, with inter-point distances closer or equal to the inter-point distance indicated by a minimum inter-point distance parameter.

The deceleration determination system 318 may also, or instead, determine for the urgent deceleration trajectory 328 a point at which the vehicle 302 is expected to be stopped (e.g., 328*f*), a point at which the deceleration of the vehicle 302 is to begin (e.g., 328*a*), and/or a point at which a jerk limit may no longer be applicable and a desired deceleration ramp rate for the vehicle 302 may be implemented.

Figure 4:
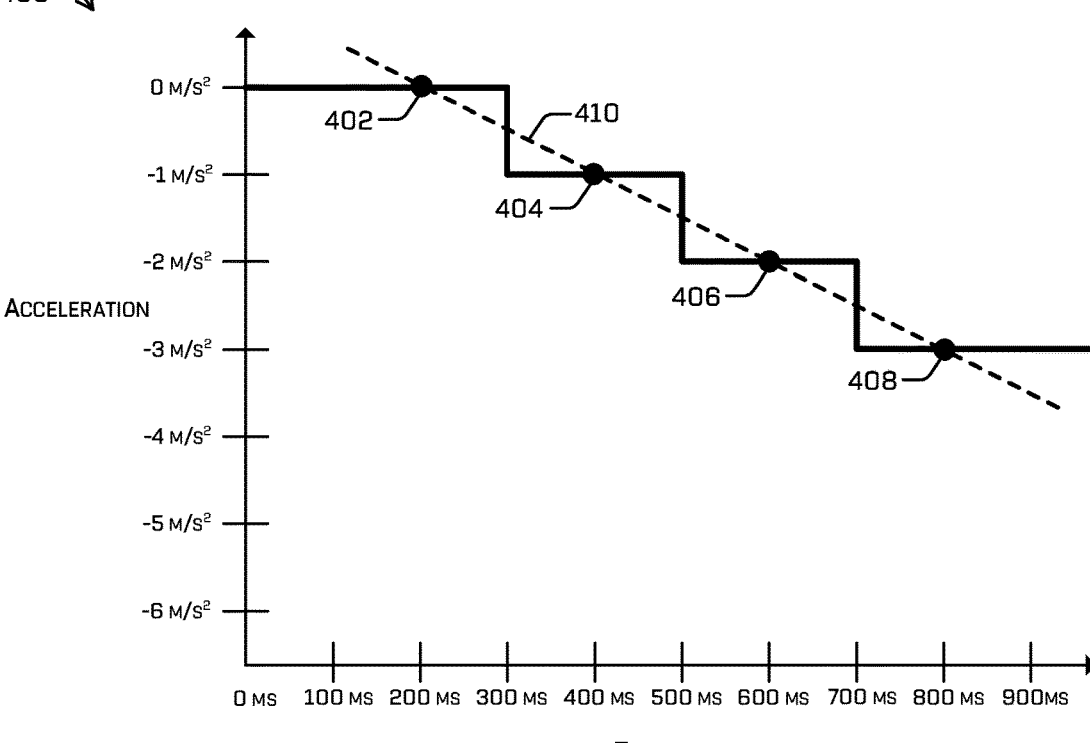
FIG. 4 depicts a graphical representation of deceleration rates over time that may be determined for trajectories, in accordance with examples of the disclosure.

FIG. 4 illustrates a graphical representation 400 of acceleration rates that may be implemented at a vehicle by one or more deceleration controls at one or more associated implementation points determined, for example, as described herein based on one or more deceleration parameters. In various examples, a vehicle computing system may determine a rate of change of deceleration rate ("ramp rate") 410 that may, for instance, be associated with a type of trajectory (e.g., non-urgent deceleration trajectory) to be determined by a deceleration determination system. In this example, the ramp rate 410 may be associated with or otherwise represent a deceleration rate change from 0 to $-3$ m/s$^2$. However, a vehicle computing system may be configured to change a vehicle's acceleration or deceleration rate at particular discrete trajectory points and/or based on one or more parameters. For example, as described herein, a jerk limit parameter may indicate a minimum amount of jerk that may be permitted by providing a value for a minimum acceleration rate change. In such examples, the vehicle computing system may not reduce the acceleration (e.g., increase the deceleration) by a rate less than the minimum jerk limit value.

Initially, for example at a trajectory starting time represented as 0 ms in representation 400, the vehicle may be traveling at a constant velocity (e.g., with 0 m/s$^2$ acceleration). In order to implement the ramp rate 410, at 200 ms, a deceleration control 402 may be implemented that reduces the vehicle acceleration (e.g., increases deceleration) to $-1$ m/s$^2$. In some examples, this reduction in the acceleration rate may be based on a jerk limit. The deceleration associated with the deceleration control 402 may be determined using a binary search algorithm as described above. In various examples, due to a reaction duration (e.g., delay in full implementation of the control due to component reaction times), the vehicle deceleration associated with the control 402 may not be realized until a period of time later, for example, at 300 ms after the trajectory starting time.

At 400 ms after the trajectory starting time, another deceleration control 404 may be implemented that further reduces the vehicle acceleration (e.g., increases deceleration) by another $-1$ m/s$^2$ to $-2$ m/s$^2$. Here again, this deceleration and amount of change in deceleration rate may be determined using a binary search algorithm and/or a jerk limit parameter, respectively. The acceleration change implemented by deceleration control 404 may be realized at 500 ms. A subsequent deceleration control 406 may be implemented at 600 ms that further reduces the vehicle acceleration (e.g., increases deceleration) by another $-1$ m/s$^2$ to $-3$ m/s$^2$ and that may be realized at 700 ms. A final control 408 may be implemented at 800 ms and that may be a same or similar deceleration control as control 406, thereby maintaining a deceleration of the vehicle at 3 m/s$^2$ (e.g., until the vehicle is stopped). The location of the control 408 may also represent or otherwise be associated with a point on the trajectory at which the target deceleration associated with the ramp rate 410 (e.g., $-3$ m/s$^2$) has been achieved.

The ramp rate 410 represented in graphical representation 400 may be achieved using these step changes to the acceleration rate. The ramp rate 410 may be relatively gradual and may represent a rate of change of deceleration that may be used with a non-urgent deceleration trajectory when urgent stopping is not required and therefore passenger comfort and smooth vehicle control may be prioritized. As illustrated, the ramp rate 410 may be implemented using step changes to the acceleration rate that take into account a jerk limit parameter. In various examples, such jerk may be limited for the safety and comfort of passengers within the vehicle (e.g., as high jerk may cause whiplash and other injuries). To limit latency and computational resources required to ensure such jerk limits are not exceeded, a numerical difference in acceleration change represented by the value of such a jerk limit parameter may be applied between the various decision points.

Figure 5:
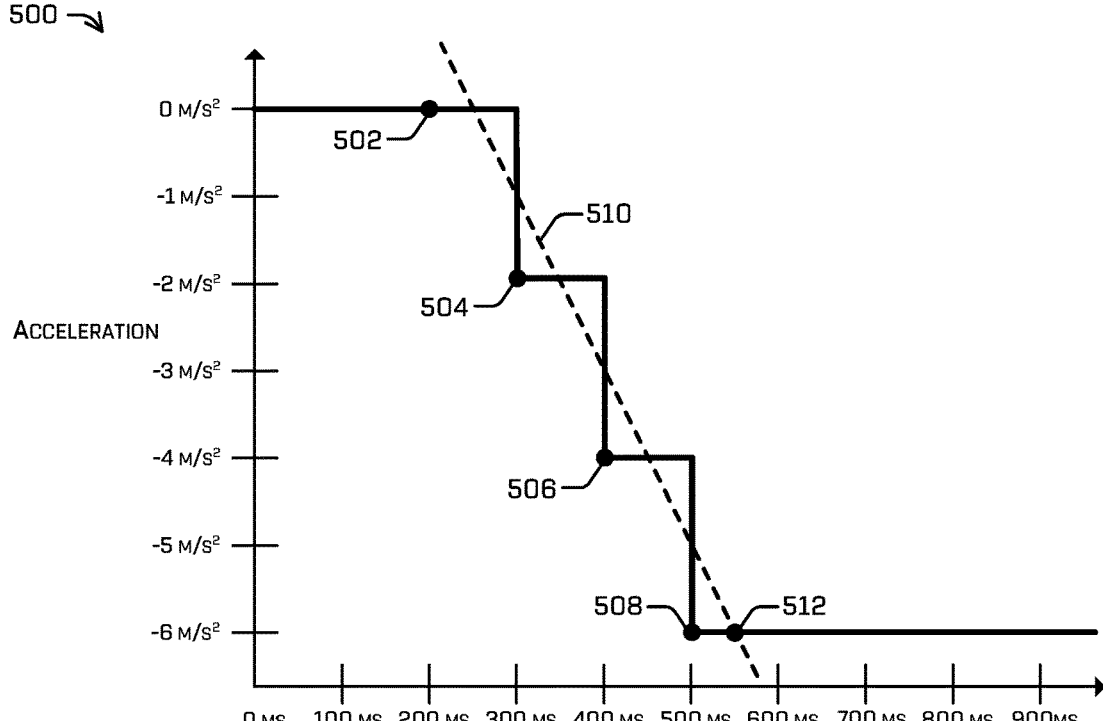
FIG. 5 depicts another graphical representation of deceleration rates over time that may be determined for trajectories, in accordance with examples of the disclosure.

FIG. 5 illustrates a graphical representation 500 of acceleration rates that may be implemented at a vehicle by one or more deceleration controls at one or more associated implementation points determined, for example, as described herein based on one or more deceleration parameters. In this example, a vehicle computing system may determine a ramp rate 510 that may be associated with a type of trajectory (e.g., urgent deceleration trajectory) to be determined by a deceleration determination system. In this example, the ramp rate 510 may be associated with or otherwise represent a deceleration rate change from 0 to $-6$ m/s$^2$. Here again, the vehicle computing system may be configured to change a vehicle's acceleration or deceleration rate at particular discrete trajectory points and/or based on one or more parameters, such as a jerk limit parameter. As described, a jerk limit parameter may represent a minimum permitted value of acceleration rate change.

Initially, for example at a trajectory starting time represented as 0 ms in representation 500, the vehicle may be traveling at a constant velocity (e.g., with 0 m/s$^2$ acceleration). In order to implement the ramp rate 410, at 200 ms, a deceleration control 502 may be implemented that reduces the vehicle acceleration (e.g., increases deceleration) to $-2$ m/s$^2$. In some examples, this reduction in the acceleration rate may be based on a jerk limit. The deceleration associated with the deceleration control 502 may be determined using a binary search algorithm as described above. As noted herein, due to a reaction duration the vehicle deceleration associated with the control 502 may not be realized until a period of time later, for example, at 300 ms after the trajectory starting time.

At 300 ms after the trajectory starting time, a deceleration control 504 may be implemented that further reduces the vehicle acceleration (e.g., increases deceleration) by another $-2$ m/s$^2$ to $-4$ m/s$^2$. Here again, this deceleration and amount of change in deceleration rate may be determined based on a binary search algorithm and/or a jerk limit parameter. The acceleration change implemented by the control 504 may be realized at 400 ms. A subsequent deceleration control 506 may be implemented at 400 ms that further reduces the vehicle acceleration (e.g., increases deceleration) by another $-2$ m/s$^2$ to $-6$ m/s$^2$ and that may be realized at 500 ms. The deceleration implemented by control 508 may be maintained at 6 m/s$^2$ (e.g., until the vehicle is stopped). The location of the point 512 may represent or otherwise be associated with a point on the trajectory at which the target deceleration associated with the ramp rate 510 (e.g., −6 m/s²) has been achieved.

The ramp rate 510 represented in graphical representation 500 may be achieved using these step changes to the acceleration rate. The ramp rate 510 may be relatively steep and may represent a rate of change of deceleration that may be used with an urgent deceleration trajectory when urgent stopping is needed due to an emergency condition or for collision avoidance. In such cases, stopping in the shortest amount of time and distance may be prioritized over passenger comfort and smooth vehicle control. As illustrated, the ramp rate 510 may be implemented using step changes to the acceleration rate that take into account a jerk limit parameter that will allow a vehicle computing system to maintain reliable control over the vehicle even when implementing relatively rapid deceleration, while also maintaining passenger comfort and safety. As compared to the acceleration rate represented in FIG. 4, the acceleration rate illustrated by the representation 500 is steeper, with greater changes in the deceleration rate implemented by the controls of FIG. 5 than by those of FIG. 4, and with implementation points closer in time to one another than those of FIG. 4.

FIG. 6 depicts a block diagram of an example system 600 for implementing the techniques described herein. In at least one example, the system 600 can include a vehicle 602. The vehicle 602 can include a vehicle computing system or device 604 that may function as and/or perform the functions of a vehicle controller for the vehicle 602. The vehicle 602 can also include one or more sensor systems 606, one or more emitters 608, one or more communication connections 610, at least one direct connection 612, and one or more drive systems 614.

The vehicle computing device 604 can include one or more processors 616 and memory 618 communicatively coupled with the one or more processors 616. In the illustrated example, the vehicle 602 is an autonomous vehicle; however, the vehicle 602 could be any other type of vehicle. In the illustrated example, the memory 618 of the vehicle computing device 604 stores a localization component 620, a perception component 622, a planning component 624, one or more system controllers 626, one or more maps 628, a prediction component 630, one or more trajectory determination systems 632, a deceleration determination systems 634, and/or the trajectory selection system 636. Though depicted in FIG. 6 as residing in memory 618 for illustrative purposes, it is contemplated that each of the localization component 620, the perception component 622, the planning component 624, the one or more system controllers 626, the one or more maps 628, the prediction component 630, the trajectory determination system(s) 632, the deceleration determination system 634, and/or a trajectory selection system 636 can additionally, or alternatively, be accessible to the vehicle 602 (e.g., stored remotely). Alternatively or additionally, the trajectory determination system(s) 632, the deceleration determination system 634, and/or the trajectory selection system 636 may be a component of and/or associated with a remote computing device and/or a separate (e.g., secondary) computing device. Examples of systems and methods for using a secondary computing device as trajectory determination system are provided in U.S. patent application Ser. No. 17/514,542, filed Oct. 29, 2021, entitled "Collision Avoidance and Mitigation in Autonomous Vehicles," the entirety of which is incorporated herein by reference.

In at least one example, the localization component 620 can include functionality to receive data from the sensor system(s) 606 to determine a position and/or orientation of the vehicle 602 (e.g., one or more of an x-, y-, z-position, roll, pitch, or yaw). For example, the localization component 620 can include and/or request/receive a map of an environment and can continuously determine a location and/or orientation of the autonomous vehicle within the map. In some instances, the localization component 620 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 620 can provide data to various components of the vehicle 602 to determine an initial position of an autonomous vehicle for generating a trajectory and/or for generating map data, as discussed herein.

In some instances, the perception component 622 can include functionality to perform object detection, segmentation, and/or classification. In some examples, the perception component 622 can provide processed sensor data that indicates a presence of an entity that is proximate to the vehicle 602 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 622 can provide processed sensor data that indicates one or more characteristics associated with a detected entity (e.g., a tracked object) and/or the environment in which the entity is positioned. The perception component 622 may use the multichannel data structures as described herein, such as the multichannel data structures generated by the described deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure as described herein (e.g., a multichannel data structure generated as output of one or more deconvolution layers (e.g., learned deconvolutional upsampling decoding layer(s)) using a learned upsampling transformation). Characteristics associated with the environment can include, but are not limited to, a presence of another entity in the environment, a state of another entity in the environment, a time of day, a day of a week, a season, a weather condition, an indication of darkness/light, etc.

In general, the planning component 624 can determine a path for the vehicle 602 to follow to traverse through an environment. In examples, the planning component 624 can determine various routes and trajectories and various levels of detail. For example, the planning component 624 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 624 can generate an instruction for guiding the autonomous vehicle along at least a portion of the route from the first location to the second location. In at least one example, the planning component 624 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 602 to navigate.

In at least one example, the vehicle computing device 604 can include one or more system controllers 626, which can be configured to control steering, propulsion, braking, safety, emitters, communication, and other systems of the vehicle 602. These system controller(s) 626 can communicate with and/or control corresponding systems of the drive system(s) 614 and/or other components of the vehicle 602.

The memory 618 can further include one or more maps 628 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 628 can include at least one map (e.g., images and/or a mesh). In some examples, the vehicle 602 can be controlled based at least in part on the maps 628. That is, the maps 628 can be used in connection with the localization component 620, the perception component 622, and/or the planning component 624 to determine a location of the vehicle 602, identify objects in an environment, and/or generate routes and/or trajectories to navigate within an environment.

In some examples, the one or more maps 628 can be stored on a remote computing device(s) (such as the computing device(s) 642) accessible via network(s) 640. In some examples, multiple maps 628 can be stored based on, for example, a characteristic (e.g., type of entity, time of day, day of week, season of the year, etc.). Storing multiple maps 628 can have similar memory requirements but increase the speed at which data in a map can be accessed.

In general, the prediction component 630 can generate predicted trajectories of objects in an environment. For example, the prediction component 630 can generate one or more predicted trajectories for vehicles, pedestrians, animals, and the like within a threshold distance from the vehicle 602. In some instances, the prediction component 630 can measure a trace of an object and generate a trajectory for the object based on observed and predicted behavior. The prediction component 630 may interact with the trajectory determination system(s) 632, the deceleration determination system 634, and/or the trajectory selection system 636 to determine an operational trajectory, for example, based on one or more candidate trajectories.

In some instances, aspects of some or all of the components discussed herein can include any models, algorithms, and/or machine learning algorithms. For example, in some instances, the components in the memory 618 (and the memory 646, discussed below) can be implemented as a neural network. For instance, the memory 618 may include a deep tracking network that may be configured with a convolutional neural network (CNN). The CNN may include one or more convolution/deconvolution layers. Alternatively, or in addition, the one or more trajectory determination systems 632, the deceleration determination system 634, and/or the trajectory selection system 636 may include or be implemented by a CNN that may perform operations as described herein.

An example neural network is an algorithm that passes input data through a series of connected layers to produce an output. Each layer in a neural network can also comprise another neural network or can comprise any number of layers, each of which may convolutional, deconvolutional, or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a braking trajectory. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 606 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, acoustic sensors, microphones, wheel encoders, environment sensors (e.g., temperature sensors, humidity sensors, light sensors, pressure sensors, etc.), etc. The sensor system(s) 606 can include multiple instances of each of these or other types of sensors. For instance, the camera sensors can include multiple cameras disposed at various locations about the exterior and/or interior of the vehicle 602. The sensor system(s) 606 can provide input to the vehicle computing device 604. Additionally, or alternatively, the sensor system(s) 606 can send sensor data, via the one or more networks 640, to the one or more computing device(s) at a particular frequency, after a lapse of a predetermined period of time, in near real-time, etc.

The vehicle 602 can also include one or more emitters 608 for emitting light (visible and/or non-visible) and/or sound. The emitter(s) 608 in an example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 602 can also include one or more communication connection(s) 610 that enable communication between the vehicle 602 and one or more other local or remote computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device 604 to another computing device or a network, such as network(s) 640. For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4GLTE, 5G, etc.) or any suitable wired or wireless communications protocol that enables the respective computing device to interface with the other computing device(s).

In at least one example, the vehicle 602 can include one or more drive systems 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include one or more sensor systems to detect conditions of the drive system(s) 614 and/or the surroundings of the vehicle 602. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 614. Furthermore, the drive system(s) 614 may also include one or more communication connection(s) that enable communication by the respective drive system with one or more other local or remote computing device(s).

In at least one example, the direct connection 612 can provide a physical interface to couple the one or more drive system(s) 614 with the body of the vehicle 602. For example, the direct connection 612 can allow the transfer of energy, fluids, air, data, etc. between the drive system(s) 614 and the vehicle. In some instances, the direct connection 612 can further releasably secure the drive system(s) 614 to the body of the vehicle 602.

In some examples, the vehicle 602 can send sensor data, audio data, collision data, and/or other types of data to one or more computing device(s) 642 via the network(s) 640. In some examples, the vehicle 602 can send raw sensor data to the computing device(s) 642. In other examples, the vehicle 602 can send processed sensor data and/or representations of sensor data (e.g., multichannel data structures representing sensor data) to the computing device(s) 642. In some examples, the vehicle 602 can send sensor data to the computing device(s) 642 at a particular frequency, after a lapse of a predetermined period of time, in near real-time, etc. In some cases, the vehicle 602 can send sensor data (raw or processed) to the computing device(s) 642 as one or more log files.

The computing device(s) 642 can include processor(s) 644 and a memory 646 storing one or more perception components 648, planning components 650, one or more trajectory determination systems 652, a deceleration determination system 654, and/or a trajectory selection system 656. In some instances, the one or more trajectory determination systems 652, the deceleration determination system 654, and/or the trajectory selection system 656 can substantially correspond to the one or more trajectory determination systems 632, the deceleration determination system 634, and the trajectory selection system 636 respectively, and can include substantially similar functionality. In some instances, the perception component 648 can substantially correspond to the perception component 622 and can include substantially similar functionality. In some instances, the planning component 650 can substantially correspond to the planning component 624 and can include substantially similar functionality.

The processor(s) 616 of the vehicle 602 and the processor(s) 644 of the computing device(s) 642 can be any suitable processor capable of executing instructions to process data and perform operations as described herein. By way of example and not limitation, the processor(s) 616 and 644 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 646 are examples of non-transitory computer-readable media. The memory 618 and 646 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in alternative examples, components of the vehicle 602 can be associated with the computing device(s) 642 and/or components of the computing device(s) 642 can be associated with the vehicle 602. That is, the vehicle 602 can perform one or more of the functions associated with the computing device(s) 642, and vice versa.

EXAMPLE CLAUSES

The following paragraphs describe various examples. Any of the examples in this section may be used with any other of the examples in this section and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving a trajectory for a vehicle to traverse through an environment from a trajectory determination system; determining a plurality of implementation points along the trajectory, an implementation point of the plurality of implementation points indicative of a decision point for modifying the trajectory; determining, for a first implementation point of the plurality of implementation points and based at least in part on the trajectory, a first deceleration control associated with a first deceleration; determining, for a second implementation point of the plurality of implementation points and based at least in part on the trajectory, a second deceleration control associated with a second deceleration; determining a modified trajectory by modifying a longitudinal profile associated with the trajectory based at least in part on the first deceleration control, the first implementation point, the second deceleration control, and the second implementation point; and causing the vehicle to be controlled in accordance with the modified trajectory.

B: The system of paragraph A, wherein the first implementation point is separated from the second implementation point based at least in part on one more of an amount of time or an amount of space.

C: The system of paragraph A or B, wherein one or more of the first implementation point or the second implementation point are determined based at least in part on a reaction duration associated.

D: The system of any of paragraphs A-C, wherein: the trajectory comprises a lateral profile, and the modified trajectory comprises the lateral profile.

E: The system of any of paragraphs A-D, wherein the operations further comprise: determining that an object is represented in the environment; and determining that an intersection probability associated with the object meets or exceeds a threshold, wherein the first deceleration control and the second deceleration control differ from associated acceleration controls of the trajectory based at least in part on the intersection probability meeting or exceeding the threshold.

F: One or more non-transitory computer-readable media storing instructions that, when executed by one or more processors, perform operations comprising: receiving a trajectory for a vehicle to traverse through an environment, the trajectory associated with a longitudinal acceleration profile; determining an implementation point along a region of travel associated with the trajectory indicative of a point at which to determine a control; determining, for the implementation point and based at least in part on the trajectory, a deceleration control; determining, as a modified trajectory, to modify an acceleration control of the trajectory at the implementation point based at least in part on the deceleration control; and causing the vehicle to be controlled based at least in part on the modified trajectory.

G: The one or more non-transitory computer-readable media of paragraph F, wherein the implementation point is determined further based at least in part on one or more of: a reaction duration associated with one or more physical components configured at the vehicle, a speed of the vehicle at the implementation point, or an acceleration of the vehicle at the implementation point.

H: The one or more non-transitory computer-readable media of paragraph F or G, wherein the operations further comprise: determining a second implementation point along the region of travel associated with the trajectory indicative of a second point at which to determine a second control; determining, for the second implementation point and based at least in part on the trajectory, a second deceleration control; and determining, as a second modified trajectory, to modify a second acceleration control of the trajectory at the second implementation point based at least in part on the second deceleration control.

I: The one or more non-transitory computer-readable media of paragraph H, wherein a first acceleration rate associated with the deceleration control is greater than a second acceleration rate associated with the second deceleration control.

J: The one or more non-transitory computer-readable media of paragraph H or I, wherein causing the vehicle to be controlled based at least in part on the modified trajectory comprises: determining, based at least in part on data associated with the environment, the modified trajectory from among the trajectory, the modified trajectory, and the second modified trajectory; and based at least in part on determining the modified trajectory, causing the vehicle to be controlled based at least in part on the modified trajectory.

K: The one or more non-transitory computer-readable media of paragraph J, wherein the data associated with the environment comprises an indication of an obstacle detected by the vehicle in the region of travel associated with the trajectory.

L: The one or more non-transitory computer-readable media of any of paragraphs H-K, wherein: the trajectory comprises a lateral profile; the modified trajectory comprises the lateral profile; and the second modified trajectory comprises the lateral profile.

M: The one or more non-transitory computer-readable media of any of paragraphs F-L, wherein determining the deceleration control comprises performing less than or equal to a threshold number of iterations of a search algorithm to determine an acceleration rate associated with the deceleration control.

N: The one or more non-transitory computer-readable media of any of paragraphs F-M, wherein the acceleration control of the trajectory is associated with a first acceleration rate that is greater than or equal to a second acceleration rate associated with the deceleration control.

O: A method comprising: receiving a trajectory for a vehicle to traverse through an environment, the trajectory associated with a longitudinal acceleration profile; determining an implementation point along a region of travel associated with the trajectory indicative of a point at which to determine a control; determining, for the implementation point and based at least in part on the trajectory, a deceleration control; determining, as a modified trajectory, to modify an acceleration control of the trajectory at the implementation point based at least in part on the deceleration control; and providing the modified trajectory to a trajectory selection system configured to determine an operational trajectory for controlling the vehicle.

P: The method of paragraph O, further comprising: determining a second implementation point along the region of travel associated with the trajectory indicative of a second point at which to determine a second control; determining, for the second implementation point and based at least in part on the trajectory, a second deceleration control; and determining, as a second modified trajectory, to modify a second acceleration control of the trajectory at the second implementation point based at least in part on the second deceleration control; and providing the second modified trajectory to the trajectory selection system configured to determine the operational trajectory from among the trajectory, the modified trajectory, and the second modified trajectory.

Q: The method of paragraph O or P, further comprising: determining a second implementation point along the region of travel indicative of a second point at which to determine a second control; determining, for the second implementation point and based at least in part on the trajectory, a second deceleration control associated with a second rate of acceleration; and determining, as the modified trajectory, to modify a second acceleration control of the trajectory at the second implementation point based at least in part on the second deceleration control.

R: The method of paragraph Q, wherein determining the second deceleration control comprises determining a second acceleration rate for the second deceleration control based at least in part on a first acceleration rate for the deceleration control and a minimum change in acceleration.

S: The method of any of paragraphs O-R, wherein: implementation points are separated by one or more of a minimum distance or a minimum amount of time; and the method further comprises determining a second implementation point along the region of travel indicative of a second point at which to determine a second control, wherein there is at least the minimum distance or the minimum amount of time between the implementation point and the second implementation point.

T: The method of any of paragraphs O-S, wherein the deceleration control is further based at least in part on one or more of: a minimum acceleration; a minimum change in acceleration; or a nominal acceleration.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform operations comprising:

receiving a trajectory for a vehicle to traverse through an environment, the trajectory associated with a longitudinal acceleration profile and comprising a first plurality of control points for performing first vehicle controls;

determining an implementation point on the trajectory and indicative of a decision point for modifying the trajectory;

determining, for the implementation point and based at least in part on the trajectory, a deceleration control;

generating a modified trajectory comprising a second plurality of control points for performing second vehicle controls by modifying an acceleration control of the trajectory at the implementation point based at least in part on the deceleration control;

determining a control point of the second plurality of control points, wherein the control point comprises a point on the trajectory separated from the implementation point by at least a minimum distance, the minimum distance based at least in part on a reaction duration associated with a time between the implementation point and the control point; and causing the vehicle to be controlled based at least in part on the modified trajectory by implementing the modified acceleration control at the control point of the second plurality of control points.

2. The system of claim 1, wherein the implementation point is a first implementation point on the trajectory separated from a second implementation point based at least in part on one more of an amount of time or an amount of space.

3. The system of claim 1, wherein the reaction duration is based at least in part on at least one of the deceleration control or a condition of the environment.

4. The system of claim 1, wherein:
the trajectory comprises a lateral profile, and
the modified trajectory comprises the lateral profile.

5. The system of claim 1, wherein the operations further comprise:
determining that an object is represented in the environment; and
determining that an intersection probability associated with the object meets or exceeds a threshold,
wherein the deceleration control differs from the acceleration control of the trajectory based at least in part on the intersection probability meeting or exceeding the threshold.

6. The system of claim 1, wherein the trajectory for the vehicle to traverse through the environment is along a planned path through the environment from a current location determined by a trajectory determination system, the trajectory further comprising a plurality of implementation points, an individual implementation point of the plurality of implementation points being indicative of an individual decision point for modifying the trajectory.

7. One or more non-transitory computer-readable media storing instructions that, when executed by one or more processors, perform operations comprising:
receiving a trajectory for a vehicle to traverse through an environment, the trajectory associated with a longitudinal acceleration profile and comprising a first plurality of control points for performing first vehicle controls;

determining an implementation point on the trajectory and indicative of a decision point for modifying the trajectory;

determining, for the implementation point and based at least in part on the trajectory, a deceleration control;

generating a modified trajectory comprising a second plurality of control points for performing second vehicle controls by modifying an acceleration control of the trajectory at the implementation point based at least in part on the deceleration control;

determining a control point of the second plurality of control points, wherein the control point comprises a point on the trajectory separated from the implementation point by at least a minimum distance, the minimum distance based at least in part on a reaction duration associated with a time between the implementation point and the control point; and causing the vehicle to be controlled based at least in part on the modified trajectory by implementing the modified acceleration control at the control point of the second plurality of control points.

8. The one or more non-transitory computer-readable media of claim 7, wherein the implementation point is determined further based at least in part on one or more of:
the reaction duration being associated with one or more physical components configured at the vehicle,
a speed of the vehicle at the implementation point, or
an acceleration of the vehicle at the implementation point.

9. The one or more non-transitory computer-readable media of claim 8, wherein the acceleration control of the trajectory is associated with a first acceleration rate that is greater than or equal to a second acceleration rate associated with the deceleration control.

10. The one or more non-transitory computer-readable media of claim 7, wherein the operations further comprise:
determining a second implementation point on the trajectory and indicative of a second point at which to implement a second vehicle control;
determining, for the second implementation point and based at least in part on the trajectory, a second deceleration control; and
generating a second modified trajectory comprising a third plurality of control points for performing third vehicle controls by modifying a second acceleration control of the trajectory at the second implementation point based at least in part on the second deceleration control.

11. The one or more non-transitory computer-readable media of claim 10, wherein a first acceleration rate associated with the deceleration control is greater than a second acceleration rate associated with the second deceleration control.

12. The one or more non-transitory computer-readable media of claim 10, wherein causing the vehicle to be controlled based at least in part on the modified trajectory comprises:
selecting, based at least in part on data associated with the environment, an operational trajectory from among the trajectory, the modified trajectory, and the second modified trajectory; and
based at least in part on selecting the operational trajectory, causing the vehicle to be controlled based at least in part on the operational trajectory.

13. The one or more non-transitory computer-readable media of claim 12, wherein the data associated with the environment comprises an indication of an obstacle detected by the vehicle in a region of travel associated with the trajectory.

14. The one or more non-transitory computer-readable media of claim 7, wherein determining the deceleration control comprises performing less than or equal to a threshold number of iterations of a search algorithm to determine an acceleration rate associated with the deceleration control.

15. A method comprising:

receiving a trajectory for a vehicle to traverse through an environment, the trajectory associated with a longitudinal acceleration profile and comprising a first plurality of control points for performing first vehicle controls;

determining an implementation point on the trajectory and indicative of a decision point for modifying the trajectory;

determining, for the implementation point and based at least in part on the trajectory, a deceleration control;

generating a modified trajectory comprising a second plurality of control points for performing second vehicle controls by modifying an acceleration control of the trajectory at the implementation point based at least in part on the deceleration control;

determining a control point of the second plurality of control points, wherein the control point comprises a point on the trajectory separated from the implementation point by at least a minimum distance, the minimum distance based at least in part on a reaction duration associated with a time between the implementation point and the control point; and causing the vehicle to be controlled based at least in part on the modified trajectory by implementing the modified acceleration control at the control point of the second plurality of control points.

16. The method of claim 15, further comprising:

determining a second implementation point on the trajectory and indicative of a second decision point for modifying the trajectory;

determining, for the second implementation point and based at least in part on the trajectory, a second deceleration control;

generating a second modified trajectory comprising a third plurality of control points for performing third vehicle controls by modifying a second acceleration control of the trajectory at the second implementation point based at least in part on the second deceleration control; and providing the second modified trajectory to a trajectory selection system configured to determine an operational trajectory from among the trajectory, the modified trajectory, and the second modified trajectory.

17. The method of claim 15, further comprising:

determining a second implementation point on the trajectory and indicative of a second decision point for modifying the trajectory;

determining, for the second implementation point and based at least in part on the trajectory, a second deceleration control associated with a second rate of acceleration; and generating the modified trajectory by modifying a second acceleration control of the trajectory at the second implementation point based at least in part on the second deceleration control.

18. The method of claim 17, wherein determining the second deceleration control comprises determining a second acceleration rate for the second deceleration control based at least in part on a first acceleration rate for the deceleration control and a minimum change in acceleration.

19. The method of claim 15, wherein:

implementation points are separated by one or more of the minimum distance or a minimum amount of time; and the method further comprises determining a second implementation point on the trajectory and indicative of a second decision point for modifying the trajectory, wherein there is at least the minimum distance or the minimum amount of time between the implementation point and the second implementation point.

20. The method of claim 15, wherein the deceleration control is further based at least in part on one or more of:

a minimum acceleration;

a minimum change in acceleration; or a nominal acceleration.

* * * * *